United States Patent
Wynn et al.

(10) Patent No.: US 10,404,872 B2
(45) Date of Patent: Sep. 3, 2019

(54) MULTI-FUNCTION DEVICE WITH SELECTIVE REDACTION

(71) Applicant: Xerox Corporation, Norwalk, CT (US)

(72) Inventors: Leslie Wynn, Hertfordshire (GB); Shane Baker, Hertfordshire (GB); Christopher Douglas Olliffe, Herts (GB); Craig S. Phillips, Bedfordshire (GB)

(73) Assignee: Xerox Corporation, Norwalk, CT (US)

( * ) Notice: Subject to any disclaimer, the term of this patent is extended or adjusted under 35 U.S.C. 154(b) by 50 days.

(21) Appl. No.: 15/589,275

(22) Filed: May 8, 2017

(65) Prior Publication Data
US 2018/0324312 A1 Nov. 8, 2018

(51) Int. Cl.
*H04N 1/00* (2006.01)
*H04N 1/44* (2006.01)
*H04N 1/387* (2006.01)

(52) U.S. Cl.
CPC ..... *H04N 1/00461* (2013.01); *H04N 1/00411* (2013.01); *H04N 1/3871* (2013.01); *H04N 1/3875* (2013.01); *H04N 1/448* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 7,802,305 | B1* | 9/2010 | Leeds | G06F 17/2735 726/26 |
| 7,876,335 | B1* | 1/2011 | Pittenger | G06F 17/21 345/629 |
| 10,061,932 | B1* | 8/2018 | Combs | H04L 9/0861 |
| 2005/0206627 | A1* | 9/2005 | Simmons | G06F 3/04812 345/179 |
| 2006/0248028 | A1* | 11/2006 | Tedesco | G06K 9/00624 706/14 |
| 2009/0019379 | A1* | 1/2009 | Pendergast | G06F 16/93 715/762 |
| 2010/0214590 | A1* | 8/2010 | Ray | H04N 1/32112 358/1.14 |
| 2010/0250497 | A1* | 9/2010 | Redlich | F41H 13/00 707/661 |
| 2011/0154180 | A1* | 6/2011 | Evanitsky | G06F 17/241 715/233 |
| 2012/0331571 | A1* | 12/2012 | Vandervort | G06F 21/6209 726/30 |
| 2013/0007123 | A1* | 1/2013 | Crosbie | H04L 63/107 709/204 |
| 2013/0272523 | A1* | 10/2013 | McCorkindale | H04N 1/44 380/243 |
| 2014/0033029 | A1* | 1/2014 | Pittenger | G06F 17/24 715/271 |
| 2014/0129936 | A1* | 5/2014 | Richards | G06F 21/6218 715/716 |

(Continued)

*Primary Examiner* — Anh-Vinh T Nguyen (57) ABSTRACT

A method and apparatus for redacting a document via a graphical user interface (GUI) on a multi-function device (MFD) are disclosed. For example, the method includes scanning a document, displaying the document on the GUI, receiving a selection of at least one portion of the document to redact via the GUI and creating a new document that redacts the at least one portion of the document that is selected.

18 Claims, 5 Drawing Sheets

(56) References Cited

U.S. PATENT DOCUMENTS

| | | | | |
|---|---|---|---|---|
| 2014/0327701 A1* | 11/2014 | Masaki | ............... | G06F 3/04886 |
| | | | | 345/634 |
| 2014/0366158 A1* | 12/2014 | Han | ........................ | G06F 21/32 |
| | | | | 726/28 |
| 2015/0074615 A1* | 3/2015 | Han | ................... | G06K 9/00033 |
| | | | | 715/863 |
| 2017/0270531 A1* | 9/2017 | Lee | ........................ | G06Q 20/42 |

* cited by examiner

MULTI-FUNCTION DEVICE WITH SELECTIVE REDACTION

The present disclosure relates generally to multi-function devices (MFDs) and, more particularly, to an MFD with an application and interface for selective redaction at a time of scanning and printing.

BACKGROUND

Certain documents may be modified to hide certain text or information in the document. Some methods may have included using a black pen or a felt pen to color over the text. However, it may still be too easy to see the text or information through the black pen or the felt pen.

Other methods may include using third party software on a document. However, this requires additional processing and cost. For example, the user must buy the third party software and then modify the document on his or her computer using the third party software. This may require additional steps as the user may have to scan the document to get a software copy of the document, transmit the document to his or her desktop computer, process the document on his or her desktop computer, transmit the document back to a MFD and then print the processed document.

SUMMARY

According to aspects illustrated herein, there are provided a method, non-transitory computer readable medium and apparatus for redacting a document via a graphical user interface (GUI) on a multi-function device (MFD). One disclosed feature of the embodiments is a method, performed by a processor of the MFD, that scans a document, displays the document on the GUI, receives a selection of at least one portion of the document to redact via the GUI and creates a new document that redacts the at least one portion of the document that is selected.

Another disclosed feature of the embodiments is a non-transitory computer-readable medium having stored thereon a plurality of instructions, the plurality of instructions including instructions which, when executed by a processor, cause the processor to perform operations that scan a document, display the document on the GUI, receive a selection of at least one portion of the document to redact via the GUI and create a new document that redacts the at least one portion of the document that is selected.

Another disclosed feature of the embodiments is an apparatus comprising a processor and a computer-readable medium storing a plurality of instructions which, when executed by the processor, cause the processor to perform operations that scan a document, display the document on the GUI, receive a selection of at least one portion of the document to redact via the GUI and create a new document that redacts the at least one portion of the document that is selected.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for redacting a document via a GUI on an MFD. As discussed above, some methods may have included using a black pen or a felt pen to color over the text. However, it may still be too easy to see the text or information through the black pen or the felt pen.

Other methods may include using third party software on a document. However, this requires additional processing and cost. For example, the user must buy the third party software and then modify the document on his or her computer using the third party software. This may require additional steps as the user may have to scan the document to get a software copy of the document, transmit the document to his or her desktop computer, process the document on his or her desktop computer, transmit the document back to a MFD and then print the processed document.

Embodiments of the present disclosure provide a modified MFD that provides selective redaction or text obscuring capabilities at a time of scanning and before printing the document. For example, the MFD of the present disclosure may scan the document and allow a user to select portions of the document using a GUI of the MFD. Furthermore, the present disclosure may actually modify or create a new electronic data file that removes the selected portions. The new electronic data file can then be printed or saved. As a result, the redacted information cannot be obtained from the document as the redacted information does not exist on the new electronic data file. In addition, after the new electronic data file is printed the redacted information may also not be found as the redacted information does not exist on the printed document.

Figure 1:
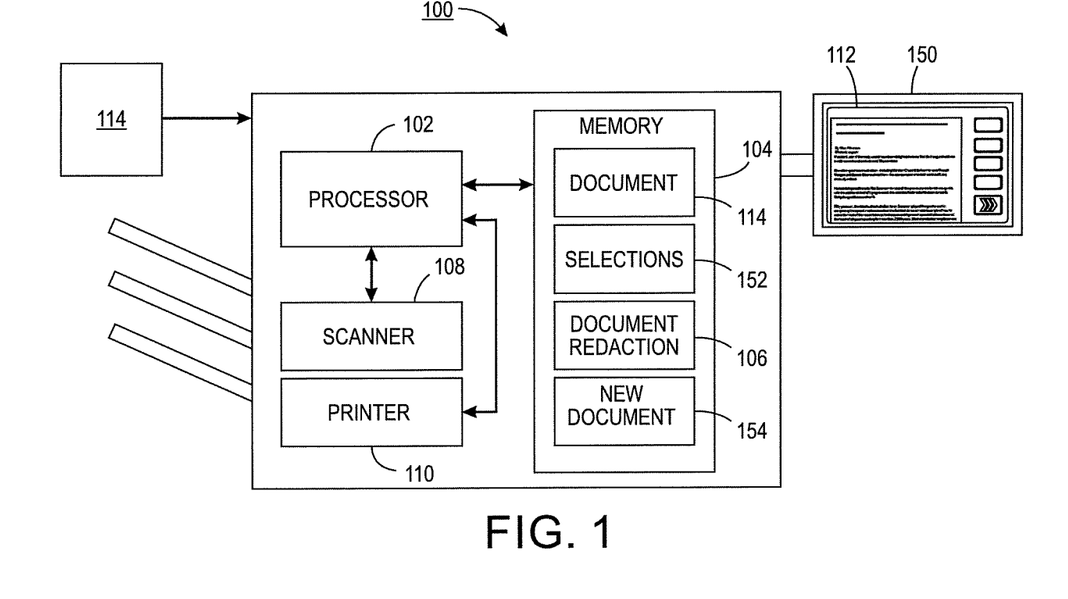
FIG. 1 illustrates a block diagram of an example MFD of the present disclosure.

FIG. 1 illustrates an example multi-function device (MFD) 100 of the present disclosure. For example, the MFD 100 may have multiple functionalities such as scanning, printing, faxing, emailing scanned documents, and the like. In one embodiment, the MFD 100 may be modified to perform the functions described herein.

In one embodiment, the MFD 100 may include a processor 102 and a memory 104. The memory 104 may include a document redaction module 106. The document redaction module 106 may store instructions that are executed by the processor 102 to perform the functions described herein that allow a user to redact selected portions of a scanned document at the MFD 100 before printing. As a result, a securely redacted document may be printed where the information beneath the portions of the document that are printed cannot be obtained.

In addition, the functions of the document redaction module 106 allow the user to redact a scanned document at the MFD 100 without the need to transmit the scanned document to another computer to perform the redaction using third party software. As a result, the MFD 100 of the present disclosure provides a convenient and efficient apparatus and method for redacting a document at a time of scanning and printing via the same device that scans and prints the document.

In one embodiment, the MFD 100 may also include a scanner 108 and a printer 110. For example, the scanner 108 may include components that read a physical document to create a software version or an electronic copy of the physical document. The printer 110 may print the electronic copy of the physical document.

In one embodiment, the MFD 100 may include a graphical user interface (GUI) 112. The GUI 112 may be displayed on an attached monitor 150 of the MFD. The monitor 150 may be a touch screen display that allows the user to provide input via touch screen buttons of the GUI 112.

It should be noted that MFD 100 has been simplified for ease of explanation. For example, the MFD 100 may include additional components that are not shown (e.g., wireless communication components, paper trays, optical components of the scanner component 108, paper output trays, rollers of the printer component 110, and the like).

Figure 2:
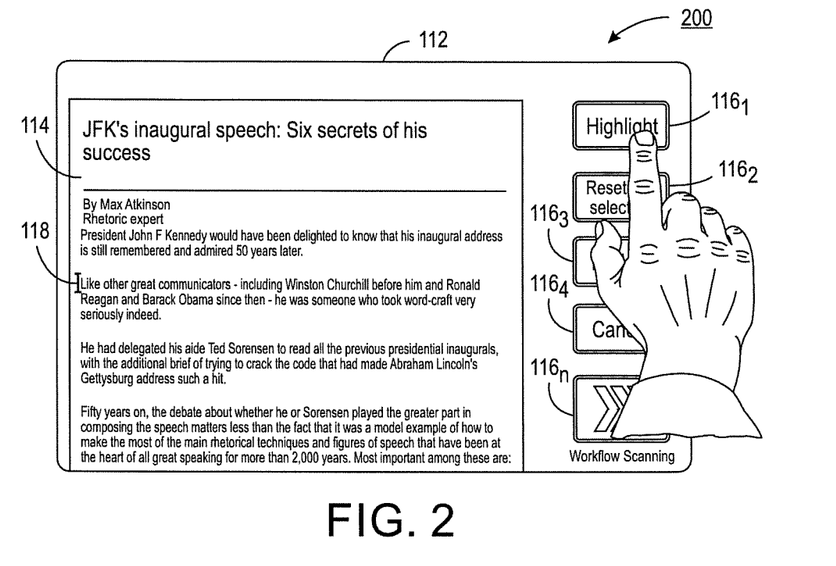
FIG. 2 illustrates a first screenshot of an example graphical user interface (GUI) of the present disclosure.

FIGS. 2-5 illustrate various different screenshots 200, 300, 400 and 500, respectively, of the GUI 112. In one embodiment, a document 114 may be scanned by the scanner 108 and the document 114 may be displayed in the GUI 112 as shown in FIG. 2. The document 114 may be temporarily stored in the memory 104 of the MFD 104.

As shown in FIG. 2, the GUI 112 may include one or more touch screen buttons $116_1$ to $116_n$ (hereinafter referred to individually as a touch screen button 116 or collectively as touch screen buttons 116). Each one of the touch screen buttons 116 may have a different function. For example, the touch screen button $116_1$ may be a highlight function, the touch screen button $116_2$ may be a reset last selection button, the touch screen button $116_3$ may be a redact function, the touch screen button $116_4$ may be a cancel function and the last button $116_n$ may be a continue function.

Although five touch screen buttons 116 are illustrated in FIG. 2, it should be noted that the GUI 112 may have any number of buttons in any desired arrangement, order or location in the GUI 112. In addition, the functions illustrated in FIG. 2 are provided as examples. The functions or label of the functions on the touch screen buttons 116 may vary and the examples illustrated in FIG. 2 should not be considered limiting.

In one embodiment, the user may select the highlight touch screen button $116_1$. In response to the highlight function being selected, a selection bar 118 (also referred to as a cursor) may appear. The selection bar 118 may help the user to visually see where on the document 114 that the user has selected for redaction.

In one embodiment, the selection bar 118 may have a height that is equivalent to a height of the text in a line of the document 114 that is selected. For example, the height of the text of the document 114 may be detected. In one embodiment, the detected height may be associated with text of a particular line within the document 114. For example, text in the title with larger letters may display a larger selection bar 118 and text in the body of the text with smaller letters may display a smaller selection bar 118.

As a result, the height or size of the selection bar 118 may be dynamically changed in accordance with a height of text within a line of text that the selection bar 118 is located. In other words, as the user touches the GUI 112 to move the selection bar 118, the height or the size of the selection bar 118 may change based on the size of the text for a line of text that is selected by a user via the GUI 112.

In one embodiment, the height of the selection bar 118 may be fixed. The amount of text that may be selected may be determined by how much or how little a user zooms in or out the document 114. For example, to select a single line of text, the user may zoom out the document 114 until a height of the text is the same as the height of the selection bar 118. Alternatively, the select multiple lines of text simultaneously, the user may zoom out the document 114 until the height of the text is small enough that multiple lines of text may be highlighted by the selection bar 118. In one embodiment, the user may zoom in and out of the document 114 using a pinching or expanding motion on the GUI 112.

In one embodiment, the user may touch a location on the document 114 to move the selection bar 118 to that location. The user may then swipe from left to right on the GUI 112 to select the portions of text to redact. In one embodiment, the user may swipe right to left on the GUI 112 to undo a selection of a portion of the document 114.

In one embodiment, to select a larger portion of the document 114 (e.g., an image, graphic, logo, or entire paragraphs of text) a user may draw an enclosure around the desired portion of the document 114. For example, using a finger, the user may draw or trace a line around the desired portion of the document 114. In one embodiment, to user may zoom in and out of the document 114 to draw a finer enclosure around the desired portion of the document 114.

Figure 3:
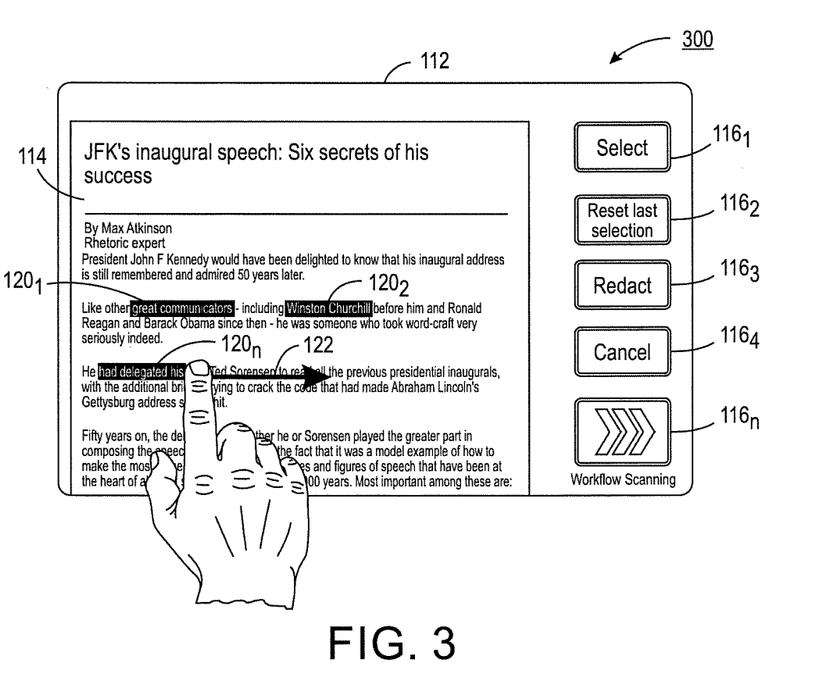
FIG. 3 illustrates a second screenshot of an example graphical user interface (GUI) of the present disclosure.

FIG. 3 illustrates an example screenshot of the GUI 112 and how each portion $120_1$–$120_n$ (also referred to herein individually as a portion 120 or collectively as portions 120) of the document 114 that is selected may be highlighted. Thus, the user may select all of the portions 120 to redact rather than having to redact each portion 120 one at a time. In one embodiment, additional pages of the document 114 may be viewed for highlighting by either swiping up or swiping down to scroll up and down or swiping left or swing right to "turn the page" on the GUI 112.

In one embodiment, the portions 120 that are selected for redaction may be temporarily stored in the memory 104 as selections 152. As will be discussed below, the user may come back at later time if a mistake is made and undo selections of portions 120 or add select additional portions 120 without having to go through the entire document 114 and make select all of the same portions $120_1$-$120_n$ again.

Figure 4:
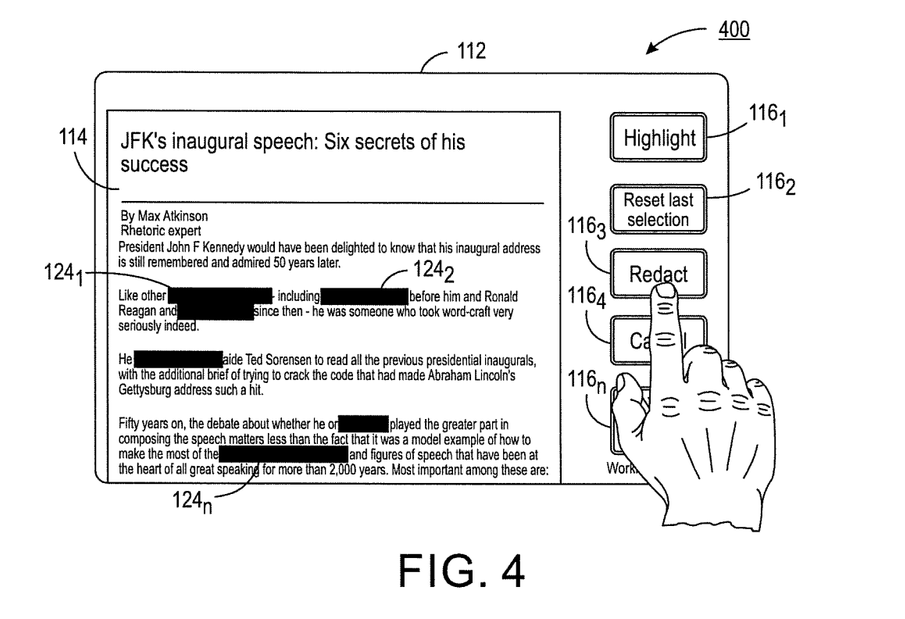
FIG. 4 illustrates a third screenshot of an example graphical user interface (GUI) of the present disclosure.

FIG. 4 illustrates an example screenshot of the GUI 112 and how the highlighted portions 120 are redacted with black boxes $124_1$-$124_n$ (herein also referred to individually as a black box 124 or collectively as black boxes 124). In one embodiment, a user may select the touch screen button $116_3$ that performs a redaction function. In response, the GUI may convert each portion 120 that is highlighted into black boxes 124. In one embodiment, the number of black boxes 124 may be equal to the portions 120 that are selected for redaction.

Figure 5:
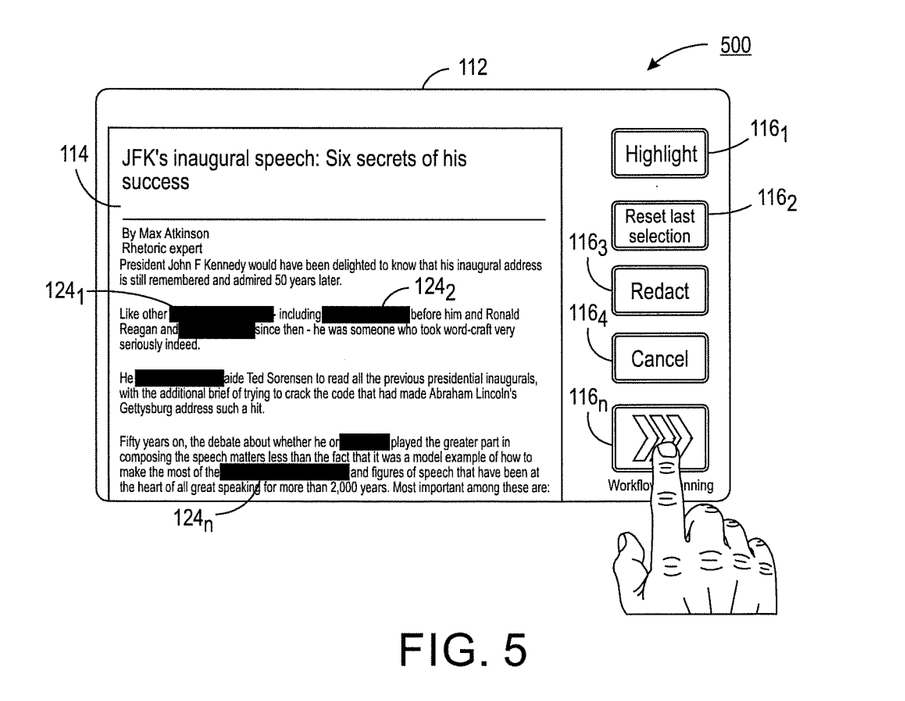
FIG. 5 illustrates a fourth screenshot of an example graphical user interface (GUI) of the present disclosure.

FIG. 5 illustrates an example screenshot of the GUI 112 and how the user may continue to printing by pressing the touch screen button $116_n$. For example, the touch screen button $116_n$ may perform a print function. In response, the processor 102 of the MFD 100 may create a new document 154 that removes the text, information, or images that are under the black boxes 124. In other words, the processor 102 does not simply create a template or second image of bars over the document 114 such that the text under bars are not printed. In contrast, the MFD 100 of the present disclosure creates a new electronic document (e.g., the new document 154). As a result, when the new document 154 is printed, the new document 154 does not contain any of the text, information, or images that are located where the black boxes 124 are located. Thus, the new document 154 cannot be "hacked" to obtain the hidden text, information, or images.

In one embodiment, the document 114, the selections 152 and the new document 154 may be temporarily stored in the memory 104. As a result, the user may print the new document 154 and realize that additional text should be redacted or too much text was redacted. The user may return to the GUI 112 to display the document 114 with the portions 120 that were selected stored in the selections 152. The user may then selection additional portions 120 to highlight and redact or may remove selections of portions 120 that should not be redacted. In one embodiment, the processor 102 of the MFD 100 may determine what text, information, or images were located where the selection was removed based on the corresponding location in the document 114 that was scanned. Then, the text, information, or images may be repopulated at the corresponding location.

After any changes to the document 114 are made, a subsequent new document may be generated. The subsequent new document may be temporarily stored as the new document 154 and may be written over the previously stored new document 154. The user may then print the new document 154.

In one embodiment, when the new document 154 is printed the new document 154 may be printed with blank spaces where the black boxes 124 or the portions 120 that were selected are located. In other words, the new document 154 may be printed to have a more subtle appearance that does not include the black boxes 124 that are traditionally used to indicate that a document has been redacted.

In one embodiment, when the user has completed the redaction of the document 114, the user may provide a confirmation of completion. For example, one of the touch screen buttons 116 may be used to provide a confirmation input. In response to the confirmation, the processor 102 of the MFD 100 may delete the document 114, the sections 152 and the new document 154 from the memory 104.

As a result, the MFD 100 of the present disclosure provides document redaction functions at a time of scanning and printing. Thus, a user may perform document redaction directly at the MFD 100 after the document 114 is scanned. In other words, the user does not have to transmit the document 114 that is scanned to another computer to perform redaction using third party software and then transmit the redacted document back to the MFD 100 for printing. Rather, the user may use the MFD 100 to perform the document redaction and print the redacted document at the MFD 100. In addition, the MFD 100 may create a new document 154 or electronic file that does not include text, information, or images that are located under the black boxes 124 or the portions 120 of the document 114 that are selected for redaction.

Figure 6:
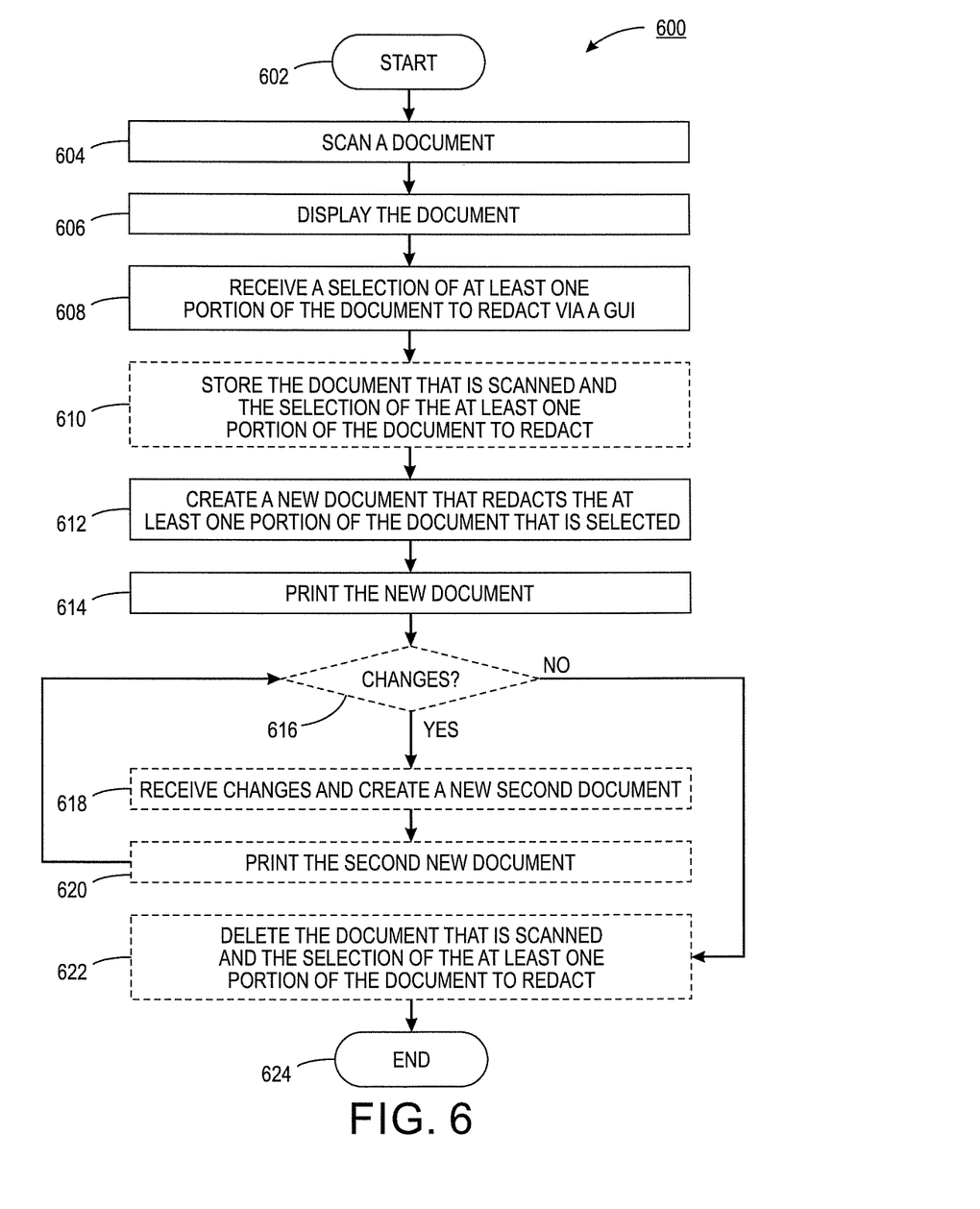
FIG. 6 illustrates a flowchart of an example method for redacting a document via a GUI on an MFD.
Figure 7:
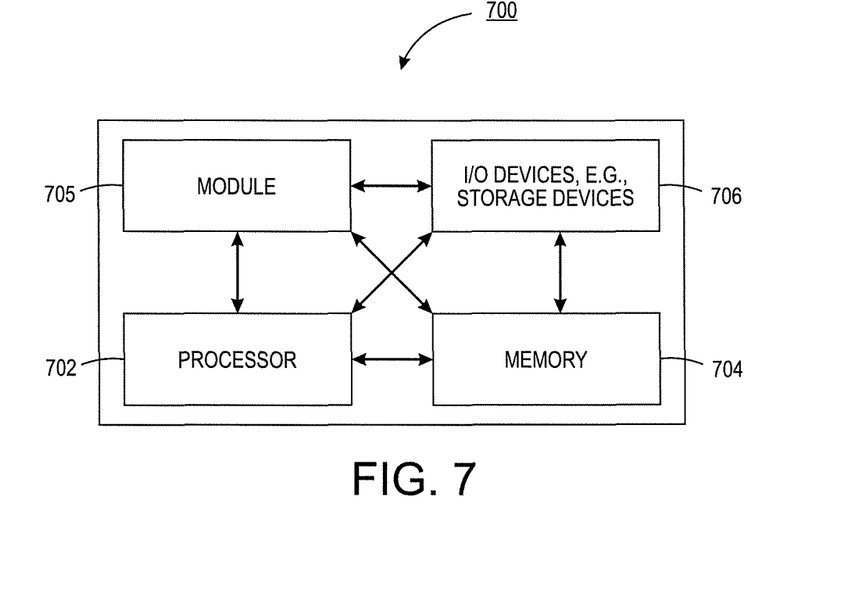
FIG. 7 illustrates a high-level block diagram of a computer suitable for use in performing the functions described herein.

FIG. 6 illustrates a flowchart of an example method 600 for redacting a document via a GUI on a MFD. In one embodiment, one or more steps or operations of the method 600 may be performed by the MFD 100 or a computer that is part of the MFD 100 as illustrated in FIG. 7 and discussed below.

At block 602, the method 600 begins. At block 604, the method 600 scans a document. For example, a user may wish to redact a document. The document may be fed through the MFD having a scanner function to scan the document into an electronic version.

At block 606, the method 600 displays the document. The MFD may have a display that provides the GUI. The display may be a touch screen display that allows the user to provide input on the GUI via touch inputs. The scanned electronic version of the document may be displayed.

At block 608, the method 600 receives a selection of at least one portion of the document to redact via the GUI. The user may select portions of the document to redact by selecting a location on the document to move a selection bar or cursor to a starting point. The user may then swipe his or her finger from left to right to select the portion of the document that he or she would like to redact. The selected portion may then be highlighted to visually show the user the portion of the document that was selected. The user may undo the selection using a touch screen button on the GUI or may undo part of the selection swiping his or her finger from the right to the left.

In one embodiment, the selection may be made around large portions of text (e.g., entire paragraphs) or images by drawing an outline around the desired portions. For example, the user may draw an enclosure around the desired portions. The portions of the document with in the enclosure may be highlighted to provide a visual indication to the user of the portion of the document that was selected.

In one embodiment, various user inputs and gestures may be used to manipulate the display and the GUI, as described above. For example, the user may zoom in and out of the document to enlarge or reduce the size of the text. The user may view different pages of the document by scrolling up and down or swiping left or right to "turn" the page.

At optional block 610, the method 600 stores the document that is scanned and the selection of the at least one portion of the document to redact. In one embodiment, the document and the selections may be stored temporarily. Storing the document that is scanned and the selections temporarily may allow the user to easily make changes to the selections of the document that are to be redacted. For example, the user may remove one or more selections of portions of the document to be redacted or may add additional selections of portions of the document to be redacted without having to re-scan the document and make all of the selections over again.

At block 612, the method 600 creates a new document that redacts the at least one portion of the document that is selected. In one embodiment, the new document may be a new electronic file that removes the text, information, or images from the selected portions of the document. In other words, the present disclosure does not simply print black boxes over the document and print the document. Rather, the present disclosure creates a new document that completely removes the text, information, or images from the selected portions of the document.

In one embodiment, the new document may include blank spaces at locations that correspond to the portions of the document that are selected in block 608. Thus, the redactions of the new document may have a more subtle appearance than other redactions methods that generate black boxes over portions of the document.

At block 614, the method 600 prints the new document. For example, the new document, or newly created electronic file, is printed. In other words, the document that was scanned is not printed with a template of black boxes placed over the originally scanned document.

At optional block 616, the method 600 determines if any changes are detected. In one embodiment, the user may review the printed new document and decide to remove a redaction or add redactions to the document. For example, the temporarily stored document and selections from optional block 610 may allow the user to go back to the GUI on the display of the MFD to quickly select additional portions of the document or quickly remove one or more previously selected portions of the document to redact.

If changes are detected, the method 600 may proceed to optional block 618. At optional block 618, the method 600 receives changes and creates a new second document. For example, the user may interact with the touch screen display of the GUI to make changes.

At optional block 620, the method 600 prints the second new document. For example, the second new document may replace the new document created in block 612. In other words, each time a change is made the MFD may generate a new document and delete the previously created new document. The method 600 then returns to optional block 616 to determine if additional changes are detected.

If no changes are detected at block 616, the method 600 proceeds to optional block 622. At optional block 622, the method 600 deletes the document that is scanned and the selection of the at least one portion of the document to redact. For example, the user may provide a confirmation that the user is satisfied with the redacted document (e.g., the new document that is printed). The user may process a "continue" touch screen button, "done" touch screen button, and the like. In response to the confirmation, the MFD may delete the temporarily stored document and selections.

It should be noted that if the optional blocks 616-622 are not performed, the method 600 may proceed directly from block 614 to block 624. At block 624, the method 600 ends.

It should be noted that the blocks in FIG. 6 that recite a determining operation or involve a decision do not necessarily require that both branches of the determining operation be practiced. In other words, one of the branches of the determining operation can be deemed as an optional step. In addition, one or more steps, blocks, functions or operations of the above described method 600 may comprise optional steps, or can be combined, separated, and/or performed in a different order from that described above, without departing from the example embodiments of the present disclosure.

FIG. 7 depicts a high-level block diagram of a computer that is dedicated to perform the functions described herein. As depicted in FIG. 7, the computer 700 comprises one or more hardware processor elements 702 (e.g., a central processing unit (CPU), a microprocessor, or a multi-core processor), a memory 704, e.g., random access memory (RAM) and/or read only memory (ROM), a module 705 for redacting a document via a GUI on a MFD, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 705 for redacting a document via a GUI on a MFD (e.g., a software program comprising computer-executable instructions) can be loaded into memory 704 and executed by hardware processor element 402 to implement the steps, functions or operations as discussed above in connection with the example method 600. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for redacting a document via a GUI on a MFD (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for redacting a document via a graphical user interface (GUI) on a multi-function device (MFD), comprising:

scanning, by a processor of the MFD, a document;
displaying, by the processor, the document on the GUI;
receiving, by the processor, a selection of a highlight button on the GUI of the MFD;
receiving, by the processor, a selection of at least one portion of the document to redact via the GUI, wherein the receiving the selection comprises detecting a user input that draws an enclosure around the at least one portion of the document via the GUI on a touch screen monitor of the MFD that displays the GUI;
receiving, by the processor, a selection of a redact button on the GUI of the MFD to replace the at least one portion of the document that is selected with a black box in the GUI of the MFD; and creating, by the processor, a new document that redacts the at least one portion of the document that is selected.

2. The method of claim 1, wherein the receiving the selection comprises:
   detecting, by the processor, a height of text of the document that is displayed;
   displaying, by the processor, a selection bar that is the height of the text; and
   highlighting, by the processor, the text within the selection bar that is contained with a range of a user input that moves from left to right.

3. The method of claim 1, wherein the receiving the selection comprises:
   displaying, by the processor, the selection bar that is a fixed height;
   receiving, by the processor, a zoom in user input or a zoom out user input to change a number of lines of text that fits within the selection bar; and
   highlighting, by the processor, the text within the number of lines that is within the selection bar that is contained within a range of a user input that moves from left to right.

4. The method of claim 1, further comprising:
   storing, by the processor, the document that is scanned and the selection of the at least one portion of the document to redact temporarily.

5. The method of claim 4, further comprising:
   printing, by the processor, the new document;
   receiving, by the processor, a user input to remove the selection of the at least one portion of the document; and
   creating, by the processor, a second new document based on the selection of the at least one portion of the document that is received.

6. The method of claim 5, wherein the user input to remove the selection of the at least one portion of the document comprises detecting a touch moving from right to left over the selection.

7. The method of claim 4, further comprising:
   printing, by the processor, the new document;
   receiving, by the processor, a user input to add a new selection of an additional at least one portion of the document; and
   creating, by the processor, a second new document based on the new selection of an additional at least one portion of the document.

8. The method of claim 4, further comprising:
   deleting, by the processor, the document that is scanned and the selection of the at least one portion of the document to redact in response to receiving a confirmation input that a user has completed redacting the document.

9. The method of claim 1, further comprising:
   printing, by the processor, the new document, wherein the new document contains blank spaces at one or more locations where the at least one portion of the document that is selected was located.

10. A non-transitory computer-readable medium storing a plurality of instructions, which when executed by a processor, cause the processor to perform operations for redacting a document via a graphical user interface (GUI) on a multi-function device (MFD), the operations comprising:
    scanning a document;
    displaying the document on the GUI;
    receiving a selection of a highlight button on the GUI of the MFD;
    receiving a selection of at least one portion of the document to redact via the GUI, wherein the receiving the selection comprises detecting a user input that draws an enclosure around the at least one portion of the document via the GUI on a touch screen monitor of the MFD that displays the GUI;
    receiving a selection of a redact button on the GUI of the MFD to replace the at least one portion of the document that is selected with a black box in the GUI of the MFD; and
    creating a new document that redacts the at least one portion of the document that is selected.

11. The non-transitory computer-readable medium of claim 10, wherein the receiving the selection comprises:
    detecting a height of text of the document that is displayed;
    displaying a selection bar that is the height of the text; and
    highlighting the text within the selection bar that is contained with a range of a user input that moves from left to right.

12. The non-transitory computer-readable medium of claim 10, wherein the receiving the selection comprises:
    displaying the selection bar that is a fixed height;
    receiving a zoom in user input or a zoom out user input to change a number of lines of text that fits within the selection bar; and
    highlighting the text within the number of lines that is within the selection bar that is contained within a range of a user input that moves from left to right.

13. The non-transitory computer-readable medium of claim 10, further comprising:
    storing the document that is scanned and the selection of the at least one portion of the document to redact temporarily.

14. The non-transitory computer-readable medium of claim 13, further comprising:
    printing the new document;
    receiving a user input to remove the selection of the at least one portion of the document; and
    creating a second new document based on the selection of the at least one portion of the document that is received.

15. The non-transitory computer-readable medium of claim 14, wherein the user input to remove the selection of the at least one portion of the document comprises detecting a touch moving from right to left over the selection.

16. The non-transitory computer-readable medium of claim 13, further comprising:
    printing the new document;
    receiving a user input to add a new selection of an additional at least one portion of the document; and
    creating a second new document based on the new selection of an additional at least one portion of the document.

17. The non-transitory computer-readable medium of claim 10, further comprising:
    printing, by the processor, the new document, wherein the new document contains blank spaces at one or more locations where the at least one portion of the document that is selected was located.

18. A method for redacting a document via a graphical user interface (GUI) on a multi-function device (MFD), comprising:
    scanning, by a processor of the MFD, a document;
    displaying, by the processor, the document on the GUI of a touch screen display of the MFD;
    receiving, by the processor, a selection of a highlight button on the GUI of the MFD;

receiving, by the processor, a selection of at least one portion of the document to redact via the GUI, wherein the receiving the selection comprises detecting a user input that draws an enclosure around the at least one portion of the document via the GUI on the touch screen display of the MFD;

highlighting, by the processor, the at least one portion of the document that is selected;

receiving, by the processor, a selection of a redact button on the GUI of the MFD to replace the at least one portion of the document that is highlighted with a black box in the GUI of the MFD;

receiving, by the processor, a confirmation to redact the at least one portion of the document that is selected;

converting, by the processor, the highlighting of the at least one portion of the document that is selected into a black box on the GUI of the touch screen display;

creating, by the processor, a new document that redacts the at least one portion of the document that is covered by the black box; and printing, by the processor, the new document wherein the new document is printed with spaces where the black box is located in the new document.

\* \* \* \* \*